VOLTAGE INFORMATION STORAGE CIRCUIT

Filed Dec. 30, 1958

INVENTOR.
BENJAMIN R. COLE
EDWARD J. SHELDON, JR.
BY
H. H. Losche
ATTORNEYS 2,985,838

VOLTAGE INFORMATION STORAGE CIRCUIT

Benjamin R. Cole, Arlington, and Edward J. Sheldon, Jr., Lexington, Mass., assignors, by mesne assignments, to the United States of America as represented by the Secretary of the Navy Filed Dec. 30, 1958, Ser. No. 784,010

4 Claims. (Cl. 328—121)

Figure 1:
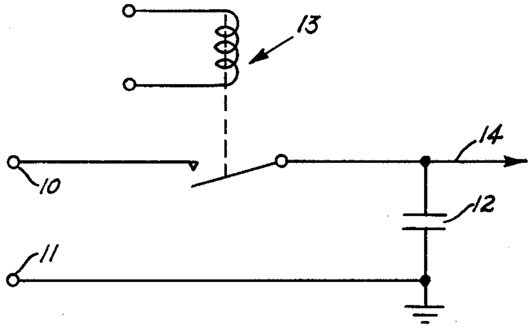

This invention relates to analog voltage information storage circuits or memory circuits and more particularly to a voltage information storage or memory circuit utilizing a capacitor of small size in combination with an electrometer tube, and a cathode coupled amplifier for storing or memorizing voltage information for long periods of time.

While voltage memory circuits or information storage circuits are well known in the prior art and in use, these known circuits have the usual disadvantage of too short a memory or storage ability. There are two general types of analog storage or memory devices. One type is positional and utilizes a potentiometer for setting at a certain value. The other type utilizes a capacitor for putting a charge thereon for memory or storage. In general, the capacitor will hold the charge for quite a long time. However, the voltage across the capacitor is of little value unless it is monitored. The standard way of doing this has been to connect the capacitor to the grid of a cathode follower. This means is reasonably good, but leakage between cathode and filament, plus effects of electron flow in the tube, causes the charge to leak off the capacitor at a fast rate. This is a disadvantage that limits the use of such storage or memory circuits to uses where such may be tolerable.

In the present invention capacitors of small size and weight may be used in a novel vacuum tube circuit to provide memory or storage of applied voltage information. In the circuit of this invention an electrometer tube is used in combination with a cathode follower and an amplifier tube with a Miller feedback capacitor coupled between the output of the amplifier tube and the input of the electrometer tube. The electrometer tube is utilized for the reason that it is a space-charge grid tube especially designed for a very high input resistance and a very low grid current. The electrometer tube may be of any well known type, one satisfactory type being a Raytheon subminiature pentode CK5886. The capacitor, due to negative feedback action of the amplifier, will appear to be $(1+K)$ times its actual capacity, where K is the gain of the amplifier. Therefore, the time constant of the capacitor and the resistance to ground of the grid will be a much larger value than the capacitor and resistance alone. Since the grid is operating at almost ground potential, the effect of filament-to-cathode leakage is minimized since the cathode is grounded. A switching means is placed in the input circuit in order that changes in voltage information to be stored or memorized is periodically or randomly switched to the storage or memory circuit appropriately as this voltage information changes. It is therefore a general object of this invention to provide a voltage information memory or storage circuit utilizing a storage element of small capacity and size in combination with an amplifier of less than unity amplification factor and high input impedance and a zero phase shift amplifier to provide rapid storage or memory of momentarily applied voltage information over long periods of time in the storage element of small capacity.

Figure 2:
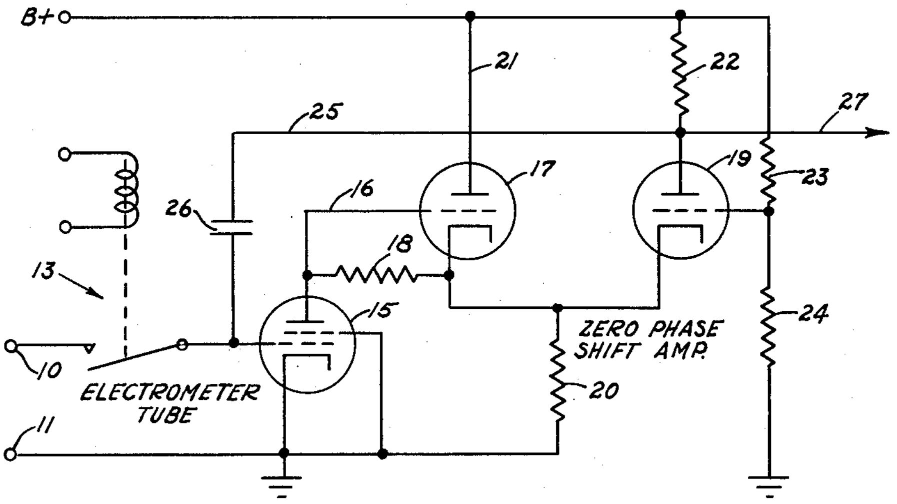

These and other objects, advantages, features, and uses may become more apparent as the description proceeds with reference to a preferred form of the invention illustrated in the drawings, in which:

Figure 1 illustrates a simplified storage or memory circuit in which a large capacity capacitor is required, and Figure 2 illustrates a circuit diagram of a preferred form of the invention.

Referring more particularly to Figure 1, there is shown input terminals 10 and 11 placed across a capacitor 12 through a relay switch 13 in the lead from terminal 10. Voltage information applied to the terminals 10 and 11 will charge the capacitor 12 whenever the relay switch 13 contacts are closed. When the relay contacts are opened the charge will be held on capacitor 12 and this capacitor will be discharged in accordance with its leakage characteristics and the current drain through the output circuit 14. One terminal of the capacitor 12 may be of a fixed potential or ground, as shown. In such a storage circuit of well known design the storage capacitor 12 must be of large size which is conducive of substantial leakage even though a high quality capacitor is used.

In the present invention input terminals 10 and 11 are coupled to a voltage information storage or memory circuit through the contacts of electrical relay 13 in the same manner as described for Figure 1. In Figure 2, however, input terminal 10 is coupled through the relay contacts to the control grid of an electrometer tube 15 and the input terminal 11 is coupled to the cathode of the electrometer tube. The cathode of electrometer tube 15 is coupled to a fixed potential illustrated herein as being ground potential. The space-charge grid of the electrometer tube 15 is coupled to a fixed or ground potential or any potential of suitable voltage level for the purpose herein set forth.

The anode output of the electrometer tube 15 is coupled directly by way of a conductor 16 to the control grid of a cathode follower tube 17 and the electrometer anode is coupled likewise through a fixed resistance 18 to the cathode of the cathode follower tube 17. The cathode of the cathode follower tube 17 is coupled in common with the cathode of an amplifier triode 19, which cathodes are biased by biasing resistor 20 coupled to a predetermined or fixed potential as ground. The anode of the cathode follower tube 17 is coupled directly to an anode voltage supply identified by B+ through a conductor 21, and the anode of the amplifier tube 19 is coupled through an anode load resistance 22 to the B+ supply. The grid of the amplifier tube 19 is coupled to a voltage divider circuit herein shown as resistors 23 and 24 in series between the B+ supply voltage and ground. The voltage divider circuit is designed to place a fixed potential on the control grid of the amplifier tube 19 of an amplitude corresponding to approximately that of the voltage amplitude on the anode of electrometer tube 15 and control grid of cathode follower tube 17.

The anode of the amplifier tube 19 is coupled by way of a feedback lead 25 to the control grid of the electrometer tube 15. This feedback lead includes a storing element such as a capacitor 26 in series to store voltage information applied to the input terminals 10 and 11. The storage capacitor 26 may be of small capacity when utilized in the combination as shown and as will become apparent in the description of operation soon to follow. A direct current output, representative of the information signals stored, is continuously present on the output lead 27 coupled to the anode of tube 19.

The electrometer tube 15, of any well known type such as a Raytheon CK5886, or GL-5740/FP-54, has a very high input resistance to the control grid and an exceedingly low control grid current. The control grid normally operates at about −4 volts and the anode normally operates at approximately 10 volts whereby this tube has very low voltage operation. The amplification factor of an electrometer tube is usually less than unity and ordinarily is not relied on for amplification of current or voltage signals. The cathode follower tube 17 and the amplifier tube 19 are shown herein as being separate tubes although they may consist of a single double triode tube of any of the well known types. The relay 13 is shown as an electromagnettic relay and is preferably of the fast acting type in which the relay contacts are only closed for a few microseconds at each interval of operation since only an instantaneous application of the voltage information to be stored is necessary to effect storage or memory in the circuit of this invention. While the switch is shown as an electrical relay switch, other switches such as a manual or other type may be used, when desired. The voltage divider circuit 23, 24 is shown as being separate, fixed resistors although it is to be understood that a potentiometer may be used wherein the control grid of amplifier tube 19 may be coupled to the movable tap of the potentiometer where it is desirable to adjust the voltage amplitude on the control grid of this tube.

In the operation of this device, let it be assumed that voltage information representative of certain intelligence such as range, speed, proximity, altitude, or depth, et cetera, is applied to the terminals 10 and 11 in the form of negative direct current voltages in an amplitude range around −4 volts. It is desirable to make periodic checks at appropriate times of this voltage intelligence and to store or memorize this voltage intelligence in the circuit hereinabove described. If the voltage intelligence on the input terminals 10 and 11 changes, it will periodically change the stored information in the circuit of Figure 2. For example, with the circuit of Figure 2 energized to produce conduction of the tubes 15, 17, and 19, let it be assumed that a voltage information signal of −4 volts is applied to terminals 10 and 11. Upon the momentary closing of the relay 13 contacts the −4 volt signal is applied to the control grid of the tube 15. The grid bias of −4 volts on the electrometer tube 15 control grid produces an anode potential that is applied to the cathode follower tube controlling the conduction therein in accordance with its grid bias. The cathode potential of tube 17 is applied to the cathode of tube 19 to control the conduction thereof. The conduction of amplifier tube 19 established in accordance with its cathode potential, as determined by the conduction of the electrometer tube 15, produces an output voltage adjusted to the desired value on the output 27 and simultaneously applies the same voltage to the storage capacitor 26. This feedback voltage, continuously applied, produces an effective charge on the capacitor 26. The above operation is instantaneous. Amplifier 19 has a large direct current gain, and a small input voltage will give a large output change. Also, during change, rate of change of output voltage will be a function of input source resistance and the effective capacity $$[(1+K)C]$$

where C is the capacity. Since relay contacts 13 are only closed momentarily the effective charge on the storage capacitor 26 by reason of the feedback will have exceedingly low leak-off through the control grid of the electrometer tube 15 since the grid current of this tube is exceedingly low by reason of the design characteristics of this tube. The input circuit being disconnected the time constant of the circuit is then determined by the leakage paths to ground of the capacitor 26, the grid of tube 15, and the switch 13. This can be made independent of the atmosphere (i.e., humidity) by sealing the critical elements of the circuit in a hermetically sealed container.

Let it be assumed further that the voltage information applied to the terminals 10 and 11 has risen to −3.9 volts and the relay 13 momentarily applies this voltage to the control grid of the electrometer tube 15. This will immediately change the conduction relation of electrometer tube 15 applying the changed anode voltage to the grid of tube 17 causing the cathode thereof to follow to impress the same cathode voltage on the amplifier tube 19, thereby reducing the anode voltage of tube 19 in an amount directly corresponding to the change in information voltage applied to the terminals 10 and 11. This voltage change is immediately reflected in the effective charge on capacitor 26 to establish the new memory or storage of the input voltage information for the output circuit 27 until a new and different voltage information signal is applied through the relay 13 contact. Each voltage change of the input voltage information at the terminals 10 and 11 will immediately produce a change in the memory or effective storage on the capacitor 26, which effective stored voltage information is held substantially constant at the output 27 over a long period of time. This effective stored voltage may be relied on for several minutes in applying a direct current voltage output information or intelligence signal to subsequent equipment, indicators, or the like. While the cathode follower tube 17 may produce some loss in signal by virtue of cathode following, the amplifier tube 19 will more than overcome the loss by reason of its great amplification factor. Since the control grid of amplifier tube 19 is tied to a fixed potential, and usually a potential corresponding to that on the control grid of cathode follower tube 17, this amplifier tube 19 acts as a grounded grid amplifier and will have zero phase shift by virtue of its fixed grid potential and varying cathode potential. By coupling the anode output of the amplifier tube 19 through a feedback circuit 25 including a capacitor 26, a voltage is made to appear on the capacitor as an effective stored value applied to the grid of the electrometer tube 15. For this reason a very small, low-absorption capacitor may be used and the current drain of the capacitor through the electrometer tube 15 is so small as to be negligible for a period of several minutes, thus obviating any necessity of a large size capacitor providing storage or memory of a voltage information signal, providing intelligence for subsequent equipment, indicators, or the like.

While many modifications and changes may become apparent or realized in carrying out this invention, it is to be understood that applicants desire to be limited only in the scope of the appended claims.

We claim:

1. A voltage information storage circuit comprising: an electrometer tube having its screen grid and cathode interconnected and having its control grid and cathode coupled in parallel to an input circuit for applying voltage information to be stored; a switching means in said input circuit for applying said voltage information at predetermined short intervals of time; an amplifier means having at least one grid input and one anode output with the grid input connected directly to the anode of said electrometer tube, said amplifier means having a cathode terminal means resistance coupled to the anode of said electrometer tube establishing anode voltage to the latter and grid bias voltage to said amplifier means and said amplifier means further having anode and cathode voltages applied thereto; and a feedback circuit coupling the output of said amplifier means to the control grid input of said electrometer tube, said feedback circuit including a storage means for storing voltage information signals in accordance with the effective value determined by said output whereby the effective voltage information is stored in a storage means of small capacity.

2. A voltage information storage circuit as set forth in claim 1 wherein said amplifier means includes a cathode follower and a triode having a grid at fixed potential, the cathodes of said cathode follower and said triode being coupled in common to said cathode voltage applied through a cathode biasing resistor and the anode of said electrometer tube being coupled to the grid of said cathode follower, said anode output of said amplifier means being the anode of said triode.

3. A voltage information storage circuit as set forth in claim 2 wherein said storage means is a capacitor.

4. A voltage information storage circuit having means of utilizing a small capacity storage element comprising: an electrometer tube having an anode, cathode, control grid, and screen grid with said screen grid and cathode interconnected; an input circuit coupled to said control grid and said cathode, said input circuit having a switch means therein for applying voltage information signals at predetermined periods to said electrometer tube; a dual triode tube means, each having an anode, a cathode, and a control grid, said cathodes being coupled in common to a cathode biasing source, said anodes being coupled to an anode voltage source with the anode of the second of said dual triodes being coupled to said anode voltage source through an impedance, the grid of the first of said dual triodes being coupled to said anode of said electrometer tube, the cathodes of said dual triode tube means being coupled through a resistance to said anode of said electrometer tube, the grid of the second of said dual triodes being coupled to a fixed potential, and the anode of said second triode being coupled to an output circuit; and a feedback circuit coupling the anode of said second triode to the control grid of said electrometer tube, said feedback circuit including a storage capacitor for storing voltage information applied to said storage circuit in accordance with the effective value placed thereon by said output whereby each voltage information signal applied when the switch means is momentarily closed will store in said storage capacitor of small capacity, the effective value stored voltage information signal being amplified by the second said dual triodes.

References Cited in the file of this patent

FOREIGN PATENTS

| | | |
|---|---|---|
| 152,826 | Australia | Aug. 14, 1953 |
| 534,648 | Canada | Dec. 18, 1956 |

OTHER REFERENCES

Electronic and Radio Engineering by F. E. Terman, McGraw-Hill Fourth edition, 1955, pp. 623–625, 652–655.

Electronic Analog Computers by Korn and Korn, McGraw-Hill, Second edition, 1956, pp. 19, 20, 211, 212, 284, 285.